United States Patent
Hryn et al.

(10) Patent No.: US 7,632,387 B1
(45) Date of Patent: Dec. 15, 2009

(54) ELECTRODIALYSIS OPERATION WITH BUFFER SOLUTION

(75) Inventors: John N. Hryn, Naperville, IL (US); Edward J. Daniels, Orland Park, IL (US); Greg K. Krumdick, Crete, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 0 days.

(21) Appl. No.: 10/824,741

(22) Filed: Apr. 15, 2004

Related U.S. Application Data

(60) Provisional application No. 60/464,715, filed on Apr. 23, 2003.

(51) Int. Cl.
*B01D 61/44* (2006.01)

(52) U.S. Cl. .............. 204/525; 204/528; 204/529; 204/531

(58) Field of Classification Search ............ 204/525, 204/528, 529, 531
See application file for complete search history.

(56) References Cited

U.S. PATENT DOCUMENTS

| 3,595,766 | A | * | 7/1971 | Scheder | 426/239 |
| 4,238,307 | A | * | 12/1980 | Perry et al. | 562/401 |
| 5,207,879 | A | * | 5/1993 | Butterworth | 204/531 |
| 6,004,445 | A | * | 12/1999 | Genders et al. | 204/537 |
| 6,221,225 | B1 | * | 4/2001 | Mani | 204/523 |
| 6,461,491 | B1 | * | 10/2002 | Hryn et al. | 204/523 |

* cited by examiner

*Primary Examiner*—Arun S Phasge
(74) *Attorney, Agent, or Firm*—Cherskov & Flaynik

(57) ABSTRACT

A new method for improving the efficiency of electrodialysis (ED) cells and stacks, in particular those used in chemical synthesis. The process entails adding a buffer solution to the stack for subsequent depletion in the stack during electrolysis. The buffer solution is regenerated continuously after depletion. This buffer process serves to control the hydrogen ion or hydroxide ion concentration so as to protect the active sites of electrodialysis membranes. The process enables electrodialysis processing options for products that are sensitive to pH changes.

20 Claims, 3 Drawing Sheets

*Fig. 3* --Prior Art--
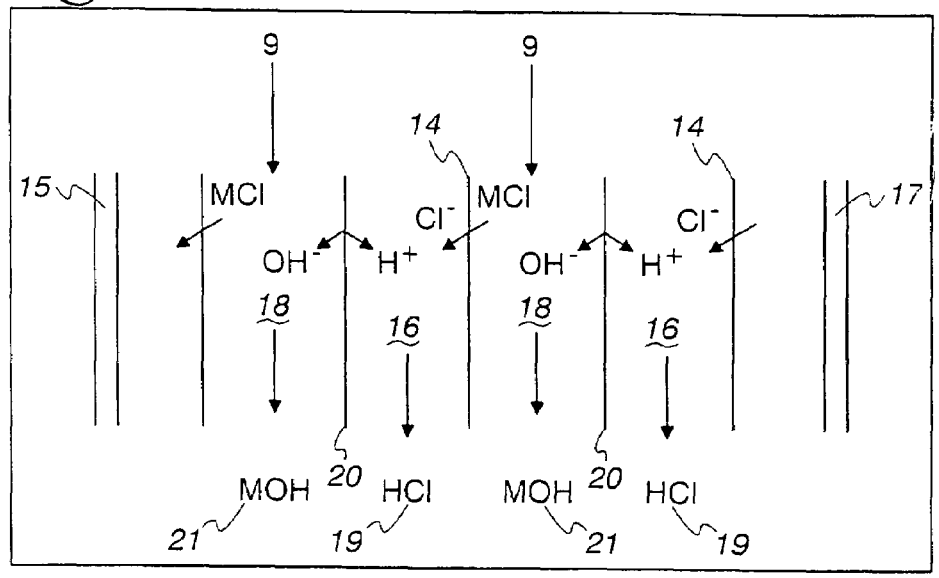
*Fig. 4*
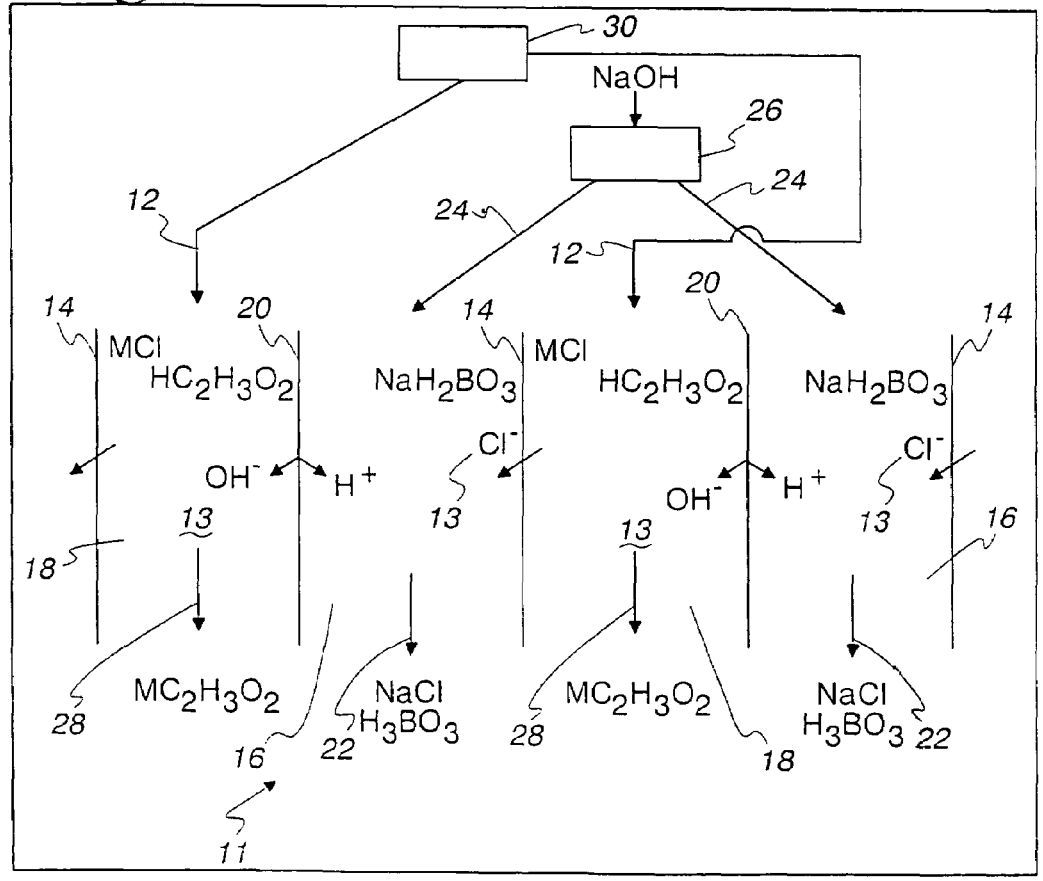

ELECTRODIALYSIS OPERATION WITH BUFFER SOLUTION

This application claims the benefits of U.S. Provisional Patent Application No. 60/464,715, filed on Apr. 23, 2003.

CONTRACTUAL ORIGIN OF INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

1. Field of the Invention

This invention relates to a method of protecting electrodialysis (ED) membranes and stack components, and, more specifically, this invention relates to a method for improving the productivity of ED cells and stacks and protecting ED membranes from the effects of acidic or basic solutions.

2. Background of the Invention

Electrodialysis was commercially introduced in the early 1960's. The development of electrodialysis provided a cost-effective way to desalt brackish water and spurred considerable interest in this area. Electrodialysis depends on the following general principles: 1) most salts dissolved in water dissociate into ions which are positively (cationic) or negatively (anionic) charged; 2) these ions are attracted to electrodes with an opposite electric charge; 3) membranes can be constructed to permit selective passage of either anions or cations.

An exemplary electrodialysis stack consists of alternating anion- and cation-exchange membranes separated by spacers or gaskets. The spacers consist of a sealing frame and a net in the active area, which is filled with an electrolyte. The spacer net prevents the membranes from touching each other. The stacked spacers align to construct two different principal channel systems, feed (diluate) and brine (concentrate). The spacers direct the feed and brine solutions into the corresponding chambers and promote flow distribution. There are several circuits in a stack due to channels formed by the combination of active sites in membranes and the channels in the spacers.

A set of two membranes and two spacers forms a cell or cell pair, and hundreds of cells can be installed in one stack. A stack has its cell membranes oriented so that the planes formed by the membranes are perpendicular to the resting surface of the wall. As such, the stack extends laterally, not vertically. The driving force for a stack is a direct current between anodes and cathodes situated at the two ends of the stack. In conjunction with the current, the membranes comprise a means for controlling the ingress and egress of ionic moieties to and from different compartments. The stack feed or diluate system and the concentrate or brine system are connected to external tanks which provide various electrolyte solutions continuously flowing through the ED stacks. During electrolysis, the diluate solution becomes depleted in salt, while the concentrate solution becomes more concentrated. As a result, this type of electrodialysis has also been referred to as concentration electrodialysis. Similar two compartment ED cells are shown in FIGS. 1, 3-9, and 11 in U.S. Pat. No. 6,461,491 awarded to Hryn, et al. on Oct. 8, 2002 and incorporated herein by reference.

Another type of electrodialysis utilizes bipolar membranes. Electrodialysis with bipolar membranes, also referred to as water splitting membranes, is an efficient way to produce acids and bases from salt solutions. Under the influence of an electric field, bipolar membranes can split water into hydrogen ions ($H^+$) and hydroxyl ions ($OH^-$). A typical three compartment ED cell is depicted as numeral 8 in FIG. 1. The cell comprises alternating cation-selective membranes 12, bipolar membranes 20, and anion-selective membranes 14 under an electrical potential. A salt solution ($M^+X^-$) 9 flowing in the salt compartment defined by the anion-selective and cation-selective membranes, generates an acidic solution ($H^+X^-$) in an acid compartment between the bipolar and anion-selective membranes. Concomitantly a basic solution ($M^+OH^-$) forms in a base compartment defined by the bipolar and cation-selective membranes, as shown in FIG. 1.

Two-compartment ED cells that utilize bipolar membranes are also common. These arrangements are typically used to split salts of weak acids and strong bases, such as sodium acetate, or split salts of strong acids and weak bases, such as ammonium chloride. For the weak-acid/strong-base case (e.g., sodium acetate), alternating bipolar and cation-selective membranes are used, while for the strong-acid/weak-base case (e.g., ammonium chloride), alternating bipolar and anion-selective membranes are used. The configuration for the strong-acid/weak-base case is shown in FIG. 2. The product base (e.g. ammonium hydroxide) is mixed with the feed salt 9 in the base compartment (e.g. ammonium chloride), while the product acid (e.g. hydrochloric acid) forms in the acid compartment. These solutions recirculate through the ED stack causing the acid loop solution (solution flowing through the acid compartment) to become more concentrated in acid, while the base loop solution becomes more basic and depleted in the salt.

Chemical synthesis can be carried out via ED in a two-compartment ED cell using bipolar membranes and anion-selective membranes. An exemplary cell is depicted in FIG. 3 as numeral 10 for the case where anion-selective membranes are used. Bipolar membranes 20 comprise an anion-permeable membrane 14 and a cation-permeable membrane 12 laminated together. This laminated construct is similar to the bipolar membrane of FIGS. 1 and 2 whereby a water channel exists. When this composite structure is oriented to have a surface of the cation-exchange layer face the anode (positive pole) 15, the imposition of an electrical potential from the anode 15 across the membrane to the cathode 17, splits water into protic ($H^+$) and hydroxyl ($OH^-$) ions. This configuration produces acidic 19 and basic 21 solutions at the surfaces of the bipolar membranes. Accordingly, the pH of a solution passing through the components of the stack of such an ED system becomes more acidic or more basic.

The extent to which pH actually decreases or increases is determined by the stack current density, i.e., the rate at which water is split and $H^+$ and $OH^-$ ions are generated, the electrolyte solution flow rate, and the size of the membranes, i.e., the residence time of the solution in the stack. In commercial operations, the residence time is large and the "acid-loop" solution 19 returning from the stack becomes very acidic, and can reach pH levels lower than 1. Similarly, the "base-loop solution" 21 can develop a very high pH such as 13.

An important parameter that dictates the effectiveness of bipolar electrolysis systems is the pH change of the solution as it passes through the ED stack. In certain configurations, it may be important to keep the pH change to a minimum, since high changes in pH may cause undesirable chemical changes to occur in the process solutions or may damage membranes or stack components. To prevent excessive drops (or rises) in pH, the present practice is to keep current density low, use high flowrates, or use short stacks to keep solution residence times low. These three factors result in lowered productivity per unit area of membrane, increased capital costs due to the necessity of using multiple short stacks instead of a few tall stacks, and increased operating costs due to excessive pumping energy.

Conversely, if the stack has greater height, operates at higher current density, and uses lower flow rates, the pH changes in the stack would cause the solution to become so acidic or basic as to damage the stack membranes, membrane spacers, and other components. More importantly, it may be impossible to produce the desired product due to large changes in solution pH.

U.S. Pat. Nos. 6,627,061, 6,331,236, 6,294,066, 6,224,731, and 6,221,225 awarded to Mani on Sep. 30, 2003, Dec. 18, 2001, Sep. 25, 2001, May 1, 2001, and Apr. 24, 2001, respectively, disclose an apparatus and method for electrodialysis of salts. Adjustment of pH is accomplished by adding base to an acid loop or adding acid to a base loop.

U.S. Pat. No. 6,461,491 awarded to Hryn, et al. on Oct. 8, 2002 discloses an apparatus and a method for electrodialysis. The method transfers dissolved salts or impurities in aqueous fluids from a diluate solution into a concentrate solution using ion-selective membranes. Acid or base is added to maintain pH level.

U.S. Pat. No. 5,268,079 awarded to Ochoa-Gomez, et al. on Dec. 7, 1993 discloses a method for the electrodialysis of salts of acids.

U.S. Pat. No. 5,198,086 awarded to Chlanda, et al. on Mar. 30, 1993 discloses a method for the electrodialysis of salts of weak acids and/or weak bases.

None of the aforementioned patents offer any narrow range of pH control or a means to internally maintain the pH at moderately acidic or basic levels during electrodialysis. Large stacks can yield enormous swings in pH which can cause process disruption and membrane damage. Without stringent pH control, they do not offer any means to prevent these potential problems. In addition, they do not offer any means for greater electrodialysis efficiency, e.g., higher current densities and greater throughput of product.

A need exists in the art for a method which provides for more cost-effective commercial-scale electrodialysis. The method should diminish or even eliminate net pH changes in the ED stacks to protect ED membranes. The method should, accordingly, allow for higher current densities, lower flow rates, and taller stacks to be more cost-effective. Finally, the method should be inexpensive.

SUMMARY OF INVENTION

An object of the present invention is to provide a method of controlling pH in bipolar electrodialysis processes that overcomes many of the disadvantages of the prior art.

Another object of the present invention is to optimize throughput of bipolar electrodialysis processes. A feature of the invention is the in situ modulation of the pH of the process so that products of the process are maintained in solution. An advantage of the process is that cell stack clogging does not occur due to unwanted precipitation, thereby leading to the production of large batches of product in shorter periods of time.

Still another object of the present invention is to provide a method whereby the effectiveness of ED can be improved. A feature of the invention is that current density can be increased due to the presence of a buffering agent. An advantage of this feature is that the quantity of equivalent grams of product transported across the membranes is increased in a manner directly proportional to the increase of the current density.

Yet another object of the present invention is to provide a method whereby a plurality of ED cells can be configured in an ED stack. A feature of the invention is that the pH is always controlled regardless of the number of cells in an ED stack. An advantage of this feature is that the output of an ED stack is greatly increased. An additional advantage is greater economy of the overall process due to the greater scale or size of the ED stack, thus resulting in lower costs.

Still another object of the present invention is to provide a method whereby the agent of pH control employed during an electrodialysis process is regenerable. A feature of the invention is that a buffering agent is regenerated by the addition of base to the acid loop solution to neutralize acid (or acid to the base loop solution to neutralize base) formed after near-depletion of the buffering agent. An advantage of this feature is that the buffering agent is conserved and the overall ED process is continuous and does not have to be interrupted to maintain the proper pH.

Yet another object of the present invention is to provide a method whereby the mode of protecting membranes in ED cells and stacks is easy to use and inexpensive. A feature of the invention is that in the event of an overly acidic pH, either a salt of the conjugate base of a particular acid, or the acid and metal hydroxide are added to a solution of the ED cell or stack by placement of the needed material in a solution in an external tank. An additional feature is that in the event of an overly basic pH, an acid is added to a solution of the ED cell or stack. An advantage of this feature is that the materials are simply added to solutions in tanks external to the ED stack and from which the solutions circulate through the stack. An additional advantage is that the materials added to the tanks' solutions are generally inexpensive.

Briefly, the invention provides a method for improving throughput in continuous electrodialysis processes, the method comprising automatically controlling the pH of acid loop solutions in strong acid/weak base configurations and of base-loop solutions in weak acid/strong base configurations.

In addition, the invention also provides a process for maintaining the condition of electrodialysis membranes in electrodialysis cell compartments, the process comprising controlling the pH in an acid-loop or base-loop solution created by the electrodialysis cell in operation within two pH values.

BRIEF DESCRIPTION OF DRAWING

The invention together with the above and other objects and advantages will be best understood from the following detailed description of the preferred embodiment of the invention shown in the accompanying drawing, wherein:

FIG. 3 is a schematic diagram of a typical electrodialysis stack; and

FIG. 4 is a schematic diagram of salient features of the method, in accordance with features of the present invention.

DETAILED DESCRIPTION OF THE INVENTION

Figure 1:
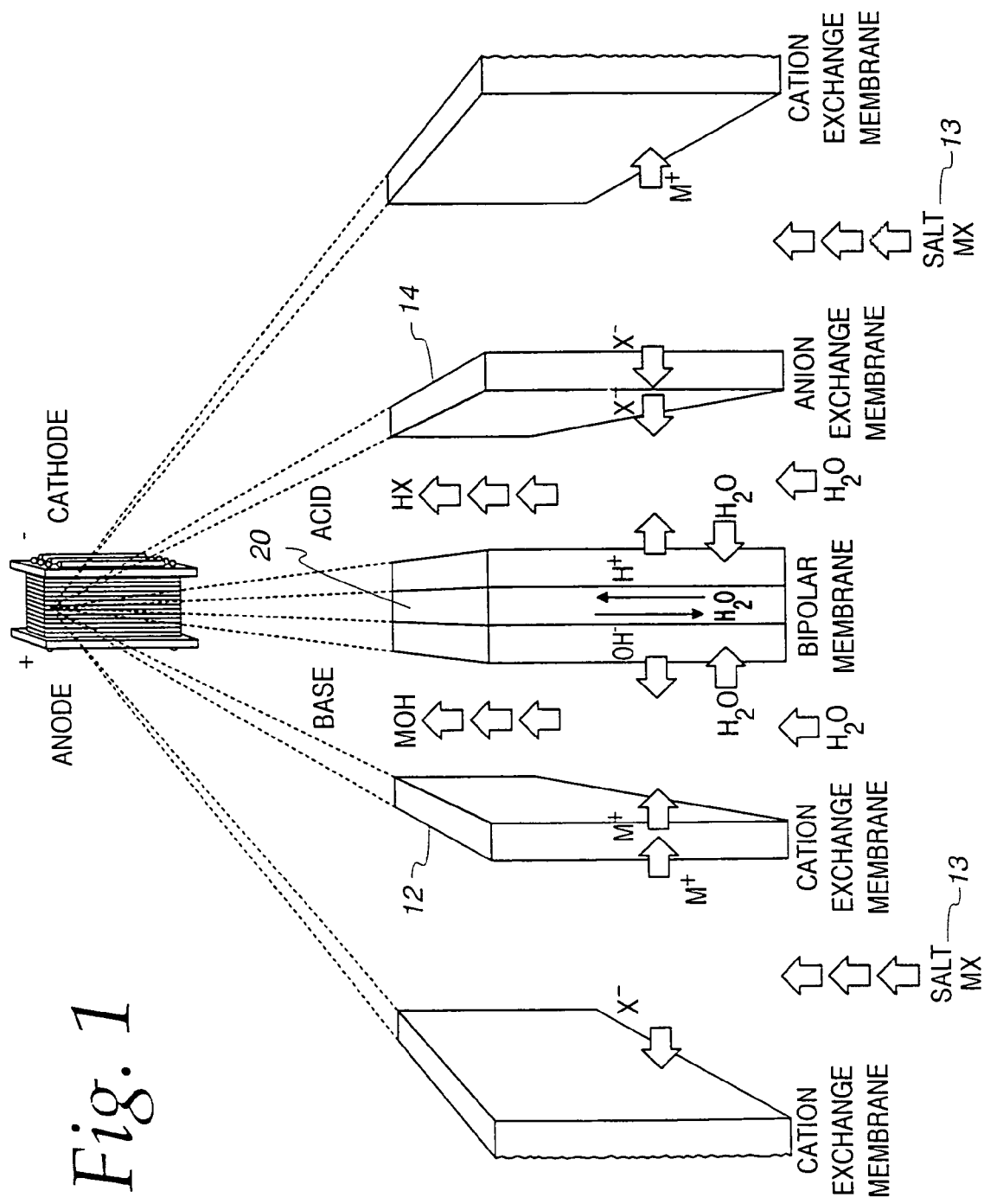
FIG. 1 is a schematic diagram of an electrodialysis device incorporating water splitting membranes.
Figure 2:
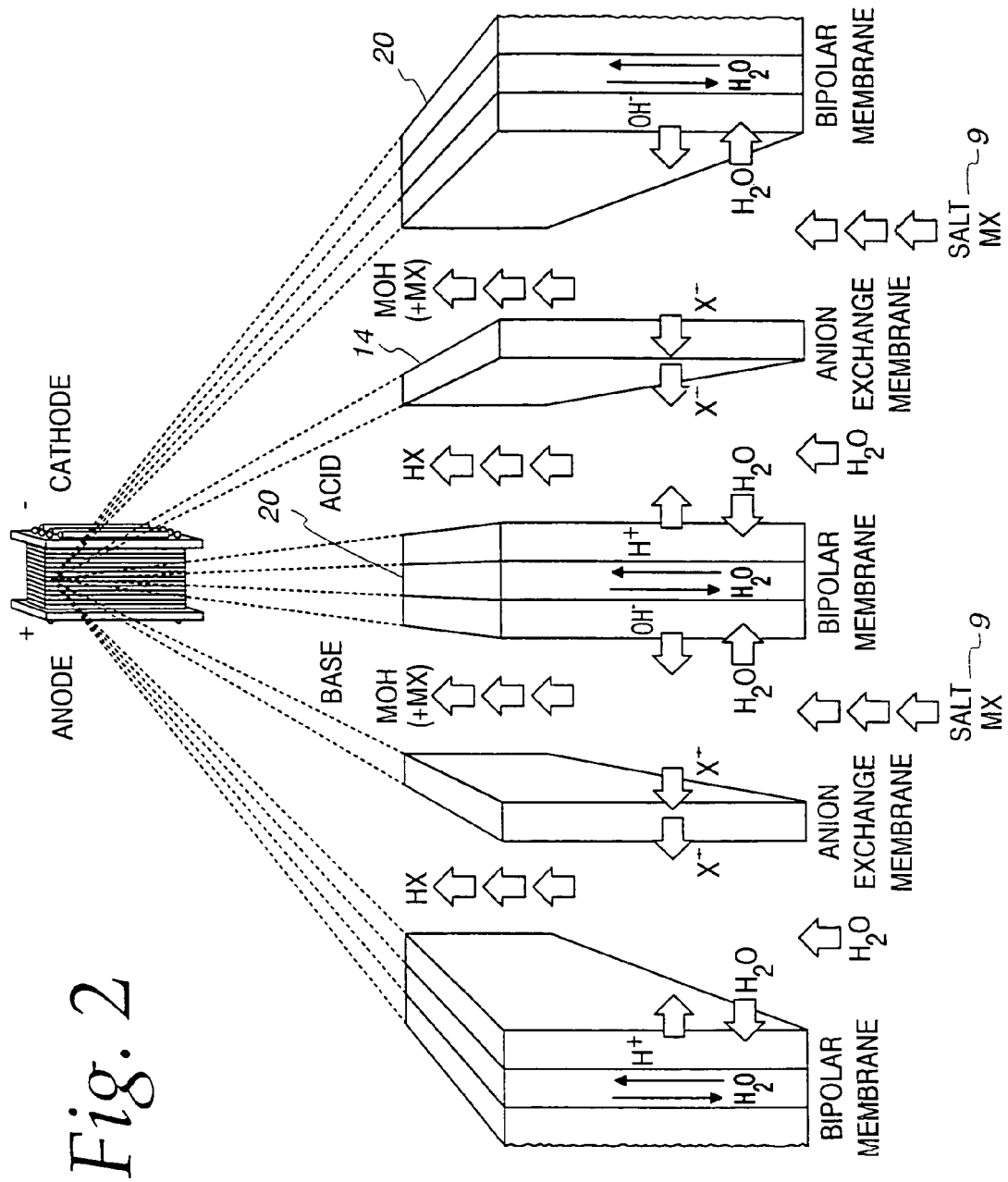
FIG. 2 is a schematic diagram of an electrodialysis cell utilizing bipolar membranes to split salts of strong-acids and weak bases.

The invention provides a process for controlling pH in a bipolar ED stack by using a buffer which is regenerated continuously. The buffer typically is regenerated external of the stack. This configuration results in the stack running at a near constant pH. As a result, the process provides improved productivity, and throughput, and also allows the process to be applicable to chemistries heretofore unthinkable given the varying pH processes of state-of-the art bipolar ED systems.

For the strong-acid/weak-base case, the inventors have found that the use of a buffering agent in the acid-loop solution of an ED stack decreases the effect of the incoming hydrogen cations ($H^+$) on the acid-loop and base-loop pH's and protects the integrity of the ED stack's membranes, in particular anion-selective membranes and their active sites.

The invention also provides for the more efficient use of electrodialysis by allowing higher current densities, slower flow rates, and taller ED stacks (of approximately 100% greater in height) without the resulting pH changes common in present state-of-the-art bipolar electrodialysis processes. Higher current densities (higher by as much as a factor of 10,000, required to keep pH changes within limits defined by the process) mean that the reaction(s) of interest in the ED stack have greater rates and thus more moles of product are produced per unit time. Further, slower flow rates (from about 50 to 70% slower) of electrolyte solution through the stack allows for more effective mixing and interaction between the membranes and the components of the electrolyte solution.

No damage occurs to the membranes and enhances considerably the potential output of ED cells by as much as a factor of 10,000. This is especially important as the membranes comprise a means for controlling the ingress and egress of ionic moieties to and from the different compartments of the ED cell.

A salient feature of the instant invention is that the higher current densities, slower flow rates, and taller stacks are possible due to the addition of a buffering agent or buffer pair to solution. The addition of the buffer can occur continuously, so as to maintain the pH of the stack at a specific value. Addition can also occur in batch when the pH wavers from an ideal value, by 2 pH units. Addition of a buffer can be made manually, or, in the alternative, using a programmed pH controller, such as those commercially available from LMI Milton Roy of Acton, Mass.

The instant invention is particularly applicable to situations such as those that occur in the synthesis of compounds (e.g., metal acetate, $MC_2H_3O_2$) from a metal chloride (MCl) and acetic acid ($HC_2H_3O_2$), where a first anion, e.g., $Cl^-$, is replaced by a second anion, e.g., acetate ($C_2H_3O_2^-$) from acetic acid ($HC_2H_3O_2$). FIG. 4 depicts this process. Acetate ion ($C_2H_3O_2^-$), acetic acid ($HC_2H_3O_2$, and metal acetate ($MC_2H_3O_2$) are present in FIG. 4 only to serve as examples.

FIG. 4 depicts portions of an ED cell/stack 11. A chloride salt and acetic acid have ingress 12 into a first stack compartment 13 which serves as the reaction chamber of the stack. The chloride ion ($Cl^-$) 13 migrates through an anion-selective membrane 14 from a "base-loop" compartment 18 to an "acid-loop" compartment 16, while hydroxide ions ($OH^-$) are produced by water-splitting at the bipolar membrane 20, to replace the $Cl^-$ 13 in the "acid-loop" compartment 16. The hydroxide ions enter into the reaction chamber 18, which in this reaction scenario, is the "base-loop" compartment. The production of $OH^-$ ions is balanced by the production of $H^+$ ions on the bipolar membrane 20. The $H^+$ ions migrate into the "acid-loop" compartments 16 to maintain electrical neutrality. Similarly, the $OH^-$ ions migrate into the "base-loop" compartments 18 to maintain electrical neutrality.

During electrolysis, the formation of hydrochloric acid in the acid loop solution compartments in the ED stack would cause the pH to drop rapidly within the acid loop compartment if a sufficient amount of a buffering agent was not present in the acid loop solution. Since the membranes are not perfect barriers to ion transport, the pH of other compartments in the stack may also be affected. The results could have detrimental effects on the integrity of membranes and stack components, and may also have detrimental effects on process chemistry. However, the presence of a buffering agent in the acid loop solution would keep the pH in the acid loop compartments within the stack at near constant pH. For example, a sodium-borate/boric acid buffering agent in the acid loop would keep the pH in the acid loop between 6 and 10. Alternatively, a sodium acetate/acetic acid buffering agent would keep the pH in the acid loop between 3 and 6. Although a sodium acetate/acetic acid buffering agent would be preferred in this example because of the presence of acetate ions already in the base loop, the example of a boric acid/sodium borate buffer will be considered to avoid confusion with acid loop and base loop ions.

In FIG. 4, sodium borate is added to a second stack compartment, in this case, to the acid loop solution as a buffering agent. Incoming hydrochloric acid is buffered with sodium borate in the acid loop compartments within the stack and converted to sodium chloride solution and boric acid solution. This buffering process maintains the pH of the acid loop compartment at the egress of the stack near neutral pH, primarily due to the presence of borate ions in the acid loop solution.

The sodium chloride and boric acid exit the stack after their formation in the "acid-loop" compartments 16 via a means of egress 22. The "acid-loop" solution reenters the stack via a means of ingress 24 from a first external tank 26. The base salt exits the stack after formation in the "base-loop" compartments 18 via a means of egress 28 and enters into a second external tank 30 which contains and circulates the "base-loop" solution via a means of ingress 12.

As the acid loop solution exits the stack, the buffering agent (sodium borate) in the acid loop is almost totally depleted. There are very few sodium ions ($Na^+$) still attached to borate ions as most of the sodium ions are "associated" with chloride ions that are transported through the anion-selective membrane to the acid loop.

The "acid-loop" solution or stream exits the stack and the buffer is regenerated by the addition of sodium hydroxide (NaOH) or caustic soda to a first external tank 26 situated remotely from the stack. The tank 26 contains and circulates the "acid-loop" solution and is part of the overall ED system 11. Sodium from the sodium hydroxide addition associates with the borate ions in solution which keeps the pH from becoming too elevated, i.e., ~pH 9 for a borate/boric acid buffer system, inasmuch as very high pH can also be a problem for ED membranes and components.

The "acid-loop"/buffer solution, which still contains the dissolved sodium chloride, is recirculated via ingress 24 from the first external tank 26 back to the ED stack 11 to the "acid-loop" compartments 16, containing the "acid-loop" solution, into which more chloride ions transport and the cycle repeats itself.

The reaction sequence for a hypothetical compound MCl, where M represents a metal ion such as sodium or potassium (K), is given by Equation 1. This sequence is suggestive of the sequence for producing $MC_2H_3O_2$. The sequence is illustrative of a salient feature of the invention which is that the acid that is generated is buffered so that the pH of the acid loop is maintained near neutral. This neutral environment is less likely to effect reactions occurring on the base-loop side of the invented system (inasmuch as no membrane system is perfect, they all leak somewhat). For example, a low pH in the acid loop could slowly acidify the base loop and adversely effect the chemistry occurring there.

$$MCl+H_2O \rightarrow MCl+H^+ +OH^- \rightarrow MOH+H^+ +Cl^- \rightarrow MOH+HCl \qquad \text{Equation 1}$$

If MOH forms in the presence of, for example, acetic acid ($HC_2H_3O_2$), then the reaction which takes place is given by Equation 2:

$$MOH + HC_2H_3O_2 \rightarrow MC_2H_3O_2 \qquad \text{Equation 2}$$

The overall reaction produces metal acetate ($MC_2H_3O_2$) and hydrochloric acid (HCl). Equation 3 gives the overall reaction:

$$MCl + HC_2H_3O_2 \rightarrow MC_2H_3O_2 + HCl \qquad \text{Equation 3}$$

The selection of the appropriate buffer pair depends upon the product being made. For example, if borates are to be synthesized in the base compartment of the ED cell 18, the use of a boric acid/borax buffer in the "acid-loop" compartment 16 of the cell would be preferred, since there would be less chance of contaminating the product. If instead, the process uses acetic acid ($HC_2H_3O_2$) and sodium ion ($Na^+$) in the form of sodium chloride (NaCl), an acetic acid/sodium acetate ($NaC_2H_3CO_2$) buffer pair can be used, depending in part on the desired pH. If the process needs to exclude sodium, but potassium is acceptable, then an acetic acid/potassium acetate ($KC_2H_3CO_2$) buffer pair can be used. The pH desired is included in the choice of a buffer pair.

In the example given herein, sodium is permitted in the process chemistry. Sodium is preferred due to a lesser cost. In that instance, the buffer is regenerated continuously with the addition of sodium hydroxide (NaOH) or caustic soda to the first external tank 26. However, if sodium is not allowed, then a boric acid/potassium borate buffer pair is used, and the buffer regenerated with the addition of potassium hydroxide (KOH) to the first external tank 26.

The ranges of molarities and volumes for a buffer in any ED system are a function of the process used in the particular ED cell/stack. The concentrations of the buffering agent are dependent upon the desired pH. The volume of any buffer solution or the respective masses of the two components of a buffer pair added to the electrodialysis stack (via the external tank) depend upon two factors. The two factors are the pH desired and the total volume of the ED cell/stack solution, i.e., the actual size of the ED system.

The two components of the buffering agent can be added to the ED system as solids, liquids, gases, solutions or any combination thereof. In the event of a agent in solution form, the solution can simply be poured into the top of the external tank. In the alternative, a buffer solution-supply conduit can be attached to the bottom of the tank, thereby facilitating addition of the solution under pressure.

For an ED stack's electrolyte that becomes acidic, a buffer pair can be created in the solution by adding a weak acid and a metal hydroxide, such as NaOH or KOH, to the acid-loop solution. In the event of an already very acidic ED stack electrolyte solution, a salt of the conjugate base of the particular acid for that ED stack can be added to the acid-loop solution. In addition, a buffer solution can be created by adding the appropriate acid and a sodium or a potassium salt of the acid's conjugate base.

In the event of an ED electrolyte stack solution becoming too basic, addition of an acidic buffer, e.g., a base and its conjugate acid, is required for pH control within the stack. For a solution already very basic, addition of the appropriate acid to a very basic solution generates the conjugate base of the acid, and thus generates a buffer pair.

The buffering agents/components can be added to the electrodialysis stack at ambient temperature. This enables internal pH regulation whereby the ever present buffer within the stack prevents large pH swings from occurring within the stack and during electrodialysis operations. The ED stack can operate in a temperature range from about 15° C. to 40° C., but a preferred mode of operation is a temperature in the high 30's ° C. Generally, a higher temperature leads to faster reaction rates, and greater productivity per unit time.

The different ED compartments in the ED cell are in electrical and chemical communication with each other.

ED cells are commercially available through Ameridia, Somerset, N.J. Two sizes are cells with an effective cell surface area of 0.17 square meters ($m^2$) [1.83 square feet ($ft^2$)], and 0.4 $m^2$ (4.3 $ft^2$). A stack of 800 cells of the latter cell size would have an effective cell area of 320 $m^2$ (3440 $ft^2$).

Ingress and egress of various fluids to and from the stack are affected by simple values. Fluid is drawn through the stack via pressure, gravity, capillary action, or gradient changes.

For illustration purposes only, the boric acid/borax buffer pair is discussed below. Other buffer pairs are thus facilitated with the following example.

EXAMPLE

For a particular application without a buffer, the acid loop solution's pH could change from about 9.0 to 1.0 within the ED stack. It is estimated that the addition of 0.0625 molar (M) borax ($Na_2B_4O_7 \cdot 10H_2O$) as a buffering agent to the acid loop will limit the pH change from 9.18 to 8.0. This is 0.0625 mole (mol) of borax per liter of ED cell/stack solution or approximately 200 pounds [~113 kilograms (Kg)] of borax for 850 gallons [~3222 liters (L)] of ED solution. More borax is added if needed. If solubility of the borax limits the amount of borax that can be added, boric acid is added instead, and sodium borate is generated in situ by the addition of sodium hydroxide to the ED solution via the external tank.

Thus, the change of the acid-loop solution's pH during electrodialysis is limited to about 1 pH unit.

It is estimated that without the use of the borax buffer, the productivity of the stack would have to be reduced 1,000 to 10,000 times, by lowering current density, increasing electrolyte solution flow rates through the stack, and/or reducing stack size, to prevent the pH changes that could damage stack components or process chemistry.

Other buffer pairs/solutions will give similar results. The criteria for selection of a buffering agent/buffer pair include the product of the particular ED process and any other chemical moieties within the system.

Although the example given is, in effect, for the production of metal borate, a suitable buffering agent can be used in any ED stack where the production of a strong acidic or basic solution could result in unwanted chemical reactions, and damage the ED membranes, or other components.

A buffer can be used in all ED cell/stack configurations, including two-, three-, four-, or greater compartment systems.

While the invention has been described with reference to details of the illustrated embodiment, these details are not intended to limit the scope of the invention as defined in the appended claims. For example, while two-compartment ED cells have been discussed in this disclosure, the invented process is valid for numerous configurations and multiple-compartment systems whenever there is a need to control pH in the stack.

The embodiment of the invention in which an exclusive property or privilege is claimed is defined as follows:

1. A method for improving throughput in continuous electrodialysis processes to create product, the method comprising automatically neutralizing byproduct acid within acid loop solutions of an electrodialysis stack by adding a buffer comprising sodium-borate and boric acid to keep the pH in the acid loop between 6 and 10, wherein the buffer comprises components of the product, or neutralizing byproduct base within base-loop solutions of an electrodialysis stack by adding a buffer comprising sodium acetate and acetic acid, wherein said buffer keeps the solutions in the stack between pH 3 and pH 6.

2. The method as recited in claim 1 wherein the process involves the formation of an acidic solution in the electrodialysis stack and said buffer is added to the solution.

3. The method as recited in claim 1 wherein the process involves the formation of a basic solution and said buffer is added to the solution.

4. The method as recited in claim 1 wherein the buffering agent is premixed with a solution situated remotely from the stack.

5. The method as recited in claim 1 wherein a buffering agent is added at ambient temperature.

6. The method as recited in claim 1 wherein the electrodialysis process operates at a temperature which ranges from about 15° C. to 40° C.

7. The method as recited in claim 1 wherein anionic and cationic moieties of the buffer are selected to minimize contamination of the product.

8. The method as recited in claim 1 wherein for an electrodialysis solution that will become acidic, a buffer pair is created by adding an acid and a metal hydroxide to the "acid-loop" stream.

9. The method as recited in claim 1 wherein for an electrodialysis solution that is already acidic, a buffer pair is created by adding a metal salt of the acid's conjugate base to the "acid-loop" stream.

10. The method as recited in claim 1 wherein for an electrodialysis solution that will become basic, a buffer pair is created by the addition of a base and its conjugate acid to the "base-loop" stream.

11. The method as recited in claim 1 wherein for an electrodialysis solution that is already basic, a buffer pair is created by the addition of an acid to the "base-loop" stream that contains, as its conjugate base, the base present in the ED electrolyte solution.

12. The method as recited in claim 1 wherein the stack has an effective cell surface area of 0.4 $m^2$ (4000 $cm^2$).

13. A process for preventing pH swings of cationic and anionic electrodialysis membranes in electrodialysis cell compartments to create product, the process comprising controlling the pH of byproduct acid within an acid-loop by adding a buffer comprising sodium-borate and boric acid to keep the pH in the acid loop between 6 and 10, wherein the buffer comprises components of the product, or controlling the pH of byproduct base within a base-loop solution by adding a buffer comprising sodium acetate and acetic acid, wherein the buffer comprises components of the product, wherein said buffer maintains solutions in the the base loop to between pH 3 and pH 6.

14. The process as recited in claim 13 wherein a buffer solution is a means of maintaining the pH of the ED acid solution to within one pH unit.

15. The method as recited in claim 14 wherein the buffer solution is supplied to the cell compartments via a tank external to the cell compartments.

16. The process as recited in claim 14 wherein the buffering solution is added at ambient temperature.

17. The method as recited in claim 13 wherein controlling the pH in the acid-loop is a means of protecting bipolar membranes and their active sites.

18. The method as recited in claim 13 wherein the electrodialysis cell operates at a temperature which ranges from about 15° C. to 40° C.

19. The method as recited in claim 13 wherein a buffer solution is added to the stack to maintain the pH of solutions within the stack to within 1 pH unit of said desired pH.

20. The process as recited in claim 13 wherein the stack has an effective cell surface area of 0.4 $m^2$ (4000 $cm^2$).

* * * * *